US012673466B2

(12) United States Patent
Zaugg et al.

(10) Patent No.: US 12,673,466 B2
(45) Date of Patent: Jul. 7, 2026

(54) ADDITIVE MANUFACTURING METHOD FOR PRODUCING A PART

(71) Applicant: GF Machining Solutions AG, Biel/Bienne (CH)

(72) Inventors: Roland Zaugg, Port (CH); Francesco Maja, Turin (IT); Romain Dubreuil, Prangins (CH); Dogan Basic, Geneva (CH)

(73) Assignee: GF MACHINING SOLUTIONS AG, Biel/Bienne (CH)

( * ) Notice: Subject to any disclaimer, the term of this patent is extended or adjusted under 35 U.S.C. 154(b) by 661 days.

(21) Appl. No.: 18/180,159

(22) Filed: Mar. 8, 2023

(65) Prior Publication Data

US 2023/0286219 A1 Sep. 14, 2023

(30) Foreign Application Priority Data

Mar. 10, 2022 (EP) ..................................... 22161275

(51) Int. Cl.
　*B29C 64/393* (2017.01)
　*B29C 64/153* (2017.01)
　　　(Continued)

(52) U.S. Cl.
　CPC .......... B29C 64/393 (2017.08); B29C 64/153 (2017.08); B33Y 50/02 (2014.12);
　　　(Continued)

(58) Field of Classification Search
　CPC ..... B29C 64/393; B29C 64/153; B33Y 50/02; B33Y 80/00; B33Y 40/20; B33Y 10/00;
　　　(Continued)

(56) References Cited

U.S. PATENT DOCUMENTS

| | | | |
|---|---|---|---|
| 10,656,626 B2 | 5/2020 | Jacobs, II | |
| 2018/0207873 A1* | 7/2018 | Neininger | B29C 64/35 |
| 2018/0260496 A1* | 9/2018 | Inoue | G06F 30/10 |

OTHER PUBLICATIONS

Ferchow Julian et al., "Design and validation of integrated clamping interfaces for post-processing and robotic handling in additive manufacturing", The International Journal of Advanced Manufacturing Technology, Oct. 18, 2021, 118, pp. 3761-3787, Springer, London.

(Continued)

*Primary Examiner* — Michael J Brown
(74) *Attorney, Agent, or Firm* — LEYDIG, VOIT & MAYER, LTD.

(57) ABSTRACT

A method for manufacturing a part by additive manufacturing including providing CAD data defining a geometry of the part, providing CAD data defining a geometry of a first clamping element, wherein the geometry of the first clamping element is determined in consideration of a geometry of a second clamping element such that the first clamping element can be clamped into the second clamping element for holding the part in a desired position for post-processing, generating machining data based on the CAD data defining the geometry of the part and the geometry of the first clamping element, and forming the part and the first clamping element by additive manufacturing process based on the machining data. The first clamping element has at least two parallel side surfaces and the second clamping element has two vice jaws positioned in parallel to each other along a longitudinal direction of the second clamping element.

19 Claims, 5 Drawing Sheets

(51) Int. Cl.
  *B33Y 50/02*      (2015.01)
  *B33Y 80/00*      (2015.01)
  *G06F 30/10*      (2020.01)
  *B22F 12/00*      (2021.01)
  *G06F 113/10*     (2020.01)

(52) U.S. Cl.
  CPC .............. *B33Y 80/00* (2014.12); *G06F 30/10*
       (2020.01); *G06F 2113/10* (2020.01)

(58) Field of Classification Search
  CPC ..... B33Y 30/00; G06F 30/10; G06F 2113/10;
       B22F 2999/00; B22F 2005/004; B22F
       5/003; B22F 10/66; B22F 12/88; B22F
       10/28; B22F 12/00; Y02P 10/25; B25B
                                1/2421
  USPC ........................................................ 700/118
  See application file for complete search history.

(56)                References Cited

OTHER PUBLICATIONS

Vignesh M et al., "Development of Biomedical Implants through
Additive Manufacturing: A Review", Journal of Materials Engi-
neering and Performance, vol. 30, No. 7, Mar. 8, 2021, pp. 4735-
4744, ASM International, Materials Park, OH, US.

* cited by examiner

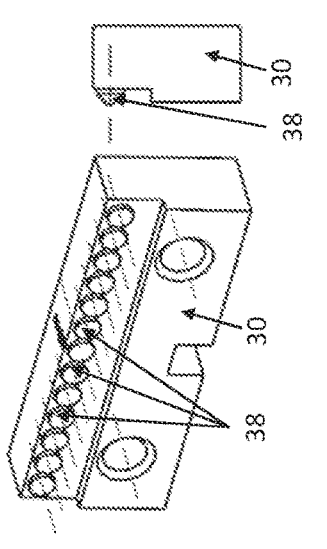
Fig. 7a
Fig. 7b
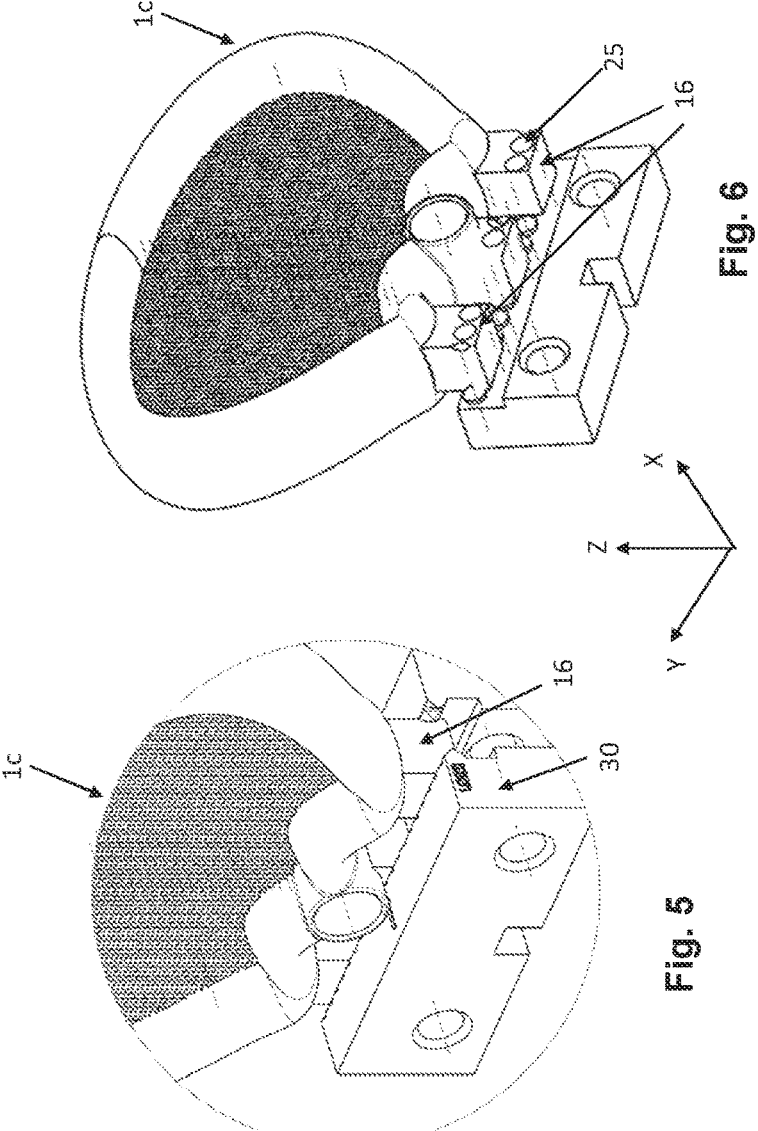
Fig. 6
Fig. 5

1

ADDITIVE MANUFACTURING METHOD FOR PRODUCING A PART

CROSS REFERENCE TO RELATED APPLICATIONS

This application claims benefit to European Patent Application No. 22 161 275.7, filed on Mar. 10, 2022, which is hereby incorporated by reference herein.

FIELD

The present invention is related to a method for manufacturing a part by an additive manufacturing process.

BACKGROUND

Additive manufacturing process is a non-traditional machining process to form a part by powder without applying any machining tools. One of the additive manufacturing process is Power Bed Fusion like Direct Metal Laser Sintering (DMLS), Selective Laser Sintering (SLS), Direct Metal Printing (DMP) and Laser Powder Bed Fusion (LPBF). This process enables to produce complex parts with low costs, because the cost mainly depends on the volume of the part to be built not on the complexity of its geometry. The short production time is another benefit from this process. Compared to the traditional machining process, such additive process does not require additional machining tools, which can also be expensive and extend the time to start the production. For these reasons, the additive manufacturing process is an attractive process in view of cost and production time.

However, there are several drawbacks using such process. The parts produced by additive manufacturing process must be further processed for several reasons. One reason is that the thermal treatment is needed for certain material. Another reason is that many parts are normally formed on a build plate mounted in the machine for additive manufacturing and must be separated from the build plate after the additive manufacturing process. In addition, post-processing of individual parts are quite often required to complete the final shape of the part. For example, additive manufacturing process cannot form screw thread with tight tolerances, which exists in many parts. Moreover, sometimes the surface quality of the part must be improved, in particular, when the surface of the manufactured part must be connected with other elements, a good surface quality is essential for ensuring the connection. In the industry applications, the post-processing is usually accomplished by a machine tool. Thus, the separated part must be mounted into the machine tool individually. Since the post-processing cannot be conducted on the build plate, the references of the parts are lost after the separation. Hence, a challenging task for post-processing is to accurately and fastly clamp the separated part in the machine tool.

In general, the part can have a very complex geometry. Thus, the part cannot be easily clamped in a standard clamping device normally equipped in the machine tool. The part must also be stably clamped in the machine tool to withstand the large force acted on the part during the post-processing, such as milling. For this reason, special fixtures are often additionally required for clamping the part. This causes additional costs. Moreover, the positioning inaccuracy of the part in the machine tool can be directly transferred into the final part, which has again a high impact on the rejection rate. Therefore, an accurate and fast clamp mechanism for clamping the part after the additive manufacturing in the machine tool for post-processing plays an essential role for the final quality of the part produced by additive manufacturing process.

In order to overcome the drawbacks of the required post-processing steps for additively manufactured parts, additional support elements are manufactured along with the part. Such additional support elements can be directly clamped in a standard clamping device. One example is a so-called bolt-in solution described in the publication of "design and validation of integrated clamping interfaces for post-processing and robotic handling in additive manufacturing" published in the international journal of advanced manufacturing technology 118, 3761-3787 (2022). This design shows a part with integrated bolt elements as clamping interface of the part. However, such design is applicable for three-jaw clamping system. It is not suitable for other clamping system, for example parallel jaw clamping system. Besides this drawback, at least three additional support elements namely, the bolt elements are required. Since the support elements are not a part of the final part, thus the material needed for forming the support elements are wasted material. The more support elements are needed, the more material is wasted.

U.S. Ser. No. 10/656,626 discloses a system for manufacturing a discrete object from an additively manufactured body of material including a precursor to a discrete object and at least a reference feature. The reference feature is applied to enable the additively manufactured body of material to be located at a manufacturing device. However, additional mechanism is required to hold the additively manufactured body of material at this position, because the reference feature is only used as a locating feature.

SUMMARY

In an embodiment, the present disclosure provides a method for manufacturing a part by additive manufacturing process comprising providing CAD data defining a geometry of the part, providing CAD data defining a geometry of a first clamping element, wherein the geometry of the first clamping element is determined in consideration of a geometry of a second clamping element such that after the additive manufacturing process the first clamping element can be clamped into the second clamping element for holding the part in a desired position for post-processing, generating machining data based on the CAD data defining the geometry of the part and the CAD data defining the geometry of the first clamping element, and forming the part and the first clamping element by additive manufacturing process based on the machining data. The first clamping element has at least two parallel side surfaces and the second clamping element has two vice jaws positioned in parallel to each other along a longitudinal direction of the second clamping element. In a clamped state, the two parallel side surfaces of the first clamping element interact with the vice jaws of the second clamping element. On at least one of the parallel side surfaces of the first clamping element, a plurality of female clamping contours are provided for engaging with a plurality of male clamping contours provided on the vise jaw in the clamped state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 5 and 6 illustrate a clamped state of a first clamping element and a second clamping element with another embodiment of the first clamping element;

FIGS. 7*a* and 7*b* illustrate cone-shaped male clamping contours;

DETAILED DESCRIPTION

Figures 1, 2, 3:
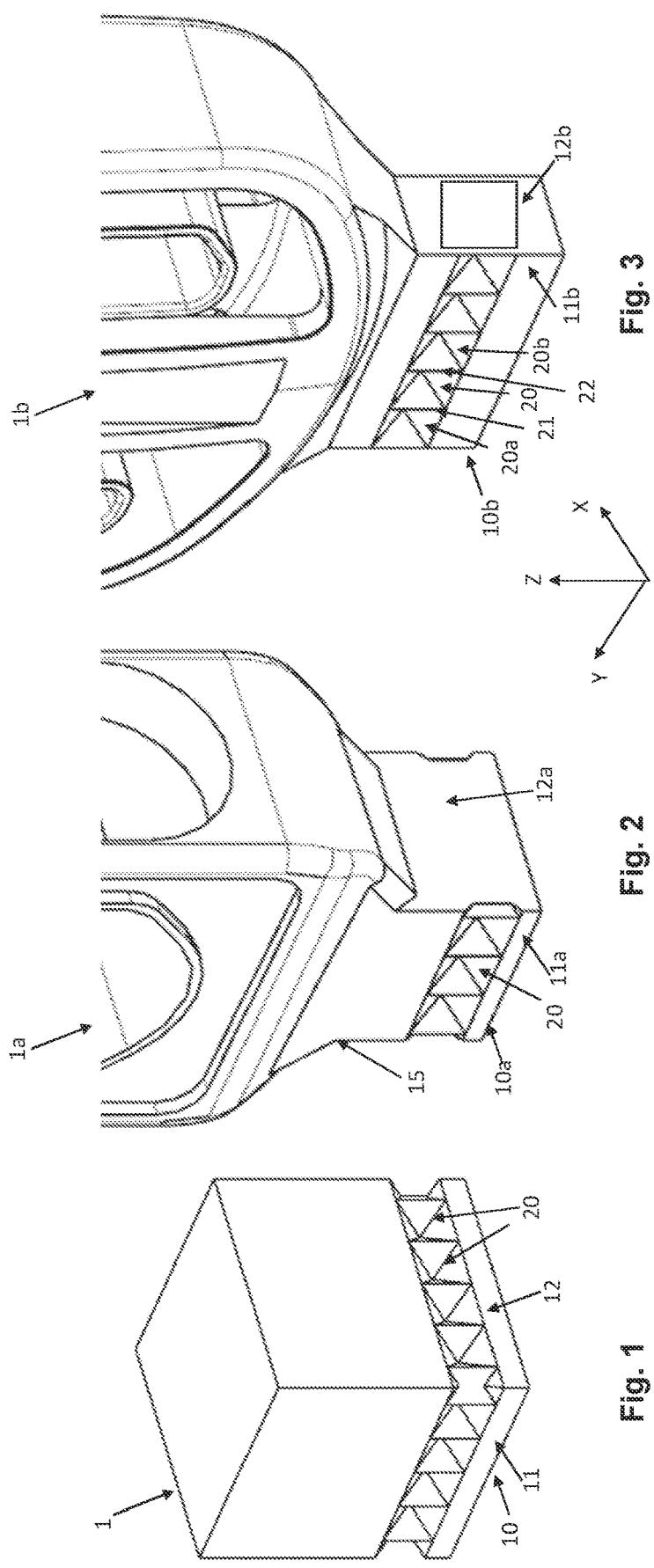
FIGS. 1-3 illustrate oblique projections of a part with a first clamping element.

In an embodiment, the present invention provides a method for manufacturing a part by additive manufacturing process with an improved production efficiency and increased quality. In particular, an embodiment provides a method for manufacturing a part by additive manufacturing process with an improved clamping mechanism for post-processing.

In an embodiment of the present invention, a method for manufacturing a part by additive manufacturing process comprises providing computer-aided design (CAD) data defining the geometry of the part and providing CAD data defining the geometry of a first clamping element. The geometry of the first clamping element is determined in consideration of the geometry of a second clamping element. In further, the first clamping element and the second clamping element are configured so that after the additive manufacturing process the first clamping element can be clamped into the second clamping element for holding the part in a desired position for post processing the part. The method further comprises generating machining data based on the CAD data defining the geometry of the part and the CAD data defining the geometry of the first clamping element and forming the part and the first clamping element by additive manufacturing process based on the machining data. The first clamping element has at least two parallel side surfaces and the second clamping element has two vice jaws positioned in parallel to each other along the longitudinal direction of the second clamping element. In the clamped state, the two parallel side surfaces of the first clamping element are interacted with the vice jaws of the second clamping element. On at least one of the parallel side surfaces of the first clamping element a plurality of female clamping contours are provided for engaging with a plurality of male clamping contours provided on the vise jaw in the clamped state. Advantageously, the first clamping element is a cuboid to be optimally clamped between the two vice jaws of the second clamping element.

The additive manufacturing process comprises a pre-process for preparing machining data. The CAD data defining the geometry of the part and the first clamping element are provided or generated. The CAD data describing a 3D-model of the part and the first clamping element is divided into the slices to generate the machining data, which can be used to form the part and the first clamping element layer by layer. Thus, the CAD data required for the additive manufacturing process describes not only the final shape of the part but also the geometry of the clamping element.

The additive manufacturing process is a fast process for producing parts having complex shape. However, post-processing is in general essential to obtain the final shape and optimize the quality feature. In further, the post-processing is conducted on the individual part after separating it from the build plate and in a machine tool. This means, the separated part must be repositioned in the machine tool. Two problems must be solved to ensure the efficient post-processing. The first problem is the positioning of the part in the machine tool, because the positioning information of the part in the machine for additive manufacturing is lost after the separation. The second problem is how to stably hold the part having a non-regular shape in the machine tool. Normally, a work piece having a simple shape like rectangular or cylinder is mounted into the machine tool as raw material for machining. In embodiments of the present invention, these problems have been considered during the design phase of the part. Before generating the machining data for manufacturing the part, a clamping system for the post-processing can be selected. In embodiments of the present invention, a center parallel vice jaw clamping system is applied, since this type of clamping system is widely used and provides a fast and reliable clamping. The second clamping element is therefore a center parallel vice jaw clamping element having two vice jaws for clamping an object therebetween. In order to avoid to directly clamp the part between the vice jaws, the first clamping element is integrated on the part such that it can be clamped between the vice jaws to hold the part formed thereon in a desired position. Since the geometry of the first clamping element is determined in consideration of the second clamping element, the first clamping element can be designed and produced to be able to precisely interact with the second clamping element. To achieve this, clamping contours are provided on the interacting surfaces of the first clamping element and the second clamping element. These clamping contours sever on one hand as a referencing element and on the other hand can improve the stability of the clamping. The plurality of female clamping contours are formed on the side surfaces of the first clamping element and a plurality of complementary-shaped male clamping contours are formed on the contacting surface of the vice jaw. In the clamped state, the two side surfaces of the first clamping element come into contact with the contacting surfaces of the two vice jaws such that each female clamping contour interacts with one male clamping contour. By this way, any parts having any shapes can be formed on the top of the first clamping element by additive manufacturing process and can be easily mounted in the machine tool for post-processing. The female clamping contours are formed on the side surfaces, the normal of which is orthogonal to the build-on direction. This has the advantage that the clamping forces can be acted on only the first clamping element not on the part.

In some embodiments, the female clamping contour and the male clamping contour have a complementary shape to obtain a form-fitting in the clamped state. Therefore, each female clamping contour fits exactly one male clamping contour to ensure an accurate referencing and reliable clamping mechanism.

Preferably, the female clamping contour has a pyramid-shaped recess that tapers from a base to an apex or an edge.

The female clamping contour is a con-shaped recess, a cubic recess, a cylindrical recess, a spherical recess, a hemispherical recess or a wedge-shaped recess. Additionally, the female clamping contour defines the references in a first direction and in a second direction. For example, if the build on direction is directed to the Z direction, the female clamping contour provides the references in the X direction and the Z direction. In this manner, an automatic referencing can be achieved along with the clamping.

In an advantageous variant, the pyramid-shaped recess has four sidewalls and an apex, which is oriented inwardly. The pyramid-shaped recess can be designed by applying different types of pyramid such as a regular pyramid having a regular polygon base. Additionally triangle pyramid is also applicable.

As the male clamping contour features a complementary shape of the female clamping contour, the male clamping contour is a protruding element that tapers from a base to an apex or an edge.

The male clamping contour has a shape of pyramid, cone, cubic, a cylinder, sphere, hemisphere, or wedge. In particular, the apex of the pyramid-shaped male clamping contours is oriented outwardly to provide an abutment against the female clamping contour in the clamped state.

However, the female clamping contour and the male clamping contour can also be designed vice versa. In this variant, the female clamping contour is a protruding element and the male clamping contour is a recess.

In an embodiment of the present invention, the parallel center clamping system is chosen because the parallel vise jaws can provide high clamping forces for variable spans. Besides, such clamping system is versatile and can be utilized for clamping a large variety of parts with various machine systems. It is almost available in all shop floors. The parallel center clamping system is also compatible with palletizing and automations systems. For example, the second clamping system can be mounted on a pallet, which can be automatically loaded into the machine tool or dismounted from the machine tool by an automatic tool changer.

The vise jaws are provided on the second clamping element for clamping the first clamping element therebetween and for holding the part during the post-processing. Each clamping jaw has a base body and a contacting surface arranged on the upper part of the base body. The plurality of male clamping contours are formed on the contacting surface to generate an abutment against the female clamping contours.

The female clamping contour and male clamping contour are designed to fulfill two functions: precise positioning and reliable clamping.

When the female clamping contour has a pyramid-shaped recess and the male clamping contour is a protruding element having a pyramid shape, the references in the two directions for example in X direction and Z direction are defined by this shape. As a result, by clamping, the position of the part in X and Z direction can be precisely controlled. In further, the male clamping contour can be reliably received in the female clamping contour to ensure the clamping. Furthermore, the male clamping contour can be reliably accommodated in the female clamping contour in order to optimally ensure clamping even with high cutting forces in all directions during the post-processing.

Depending on the dimensions of the part, the size of the first clamping element can vary. In further, the number of the female clamping contours provided on the first element can also simply changed during the design phase. In a preferred variant, the plurality of female clamping contours are provided along the horizontal direction, e.g. in X direction with equal distances to each other. However, in certain cases the female clamping contours can also be provided on an irregular base with non-equal distances. It is further considerable to provide more than one first clamping element for one part. The first clamping elements are connected together through the part with a distance apart to each other. Preferably, on each first clamping element at least one female clamping contour is formed. In the clamped state, all first clamping elements are engaged with one second clamping element.

The pyramid-shape provides also the advantage in view of production tolerances with high clamping force to avoid deforming the part by additional machining forces and stable clamping. Therefore, no change in position by additional forces generated during the post-processing can be raised. Moreover, pyramid provides a large clamping area. Thus, achieve a high clamping fore. The female clamping contours are provided on the low part of the first clamping element but apart from the bottom surface with a defined distance. This can make the separation easier because the female clamping contours cannot be cut by the cutting tools during separation. Additionally, as the bottom surface of the first clamping element does not come into contact with the second clamping element, the surface quality of the bottom surface is irrelevant and therefor can be low.

The length of a vise jaw can vary for example in the range of 50 mm to 220 mm, the first clamping element can engage with the second clamping element at any position along the whole length. Normally, the length of the first clamping element is smaller than the length of the second clamping element, namely the length of the vise jaw. Thus, a marking is provided to provide a reference on a third direction, namely in Y direction. To achieve this, a first marking is provided on the first clamping element and a second marking is provided on the second clamping element for referencing in the third direction, in particular, the marking defines the zero-point in Y direction. In particular, the first marking and/or the second marking is a visual marking such as a color or a pattern.

Advantageously, the first clamping element is a solid element to obtain stable clamping.

After the completion of the post-processing, the first clamping element must be removed from the part. Hence, a separating portion is formed between the first clamping element and the part by additive manufacturing process.

Besides manufacturing the part and the first clamping element by the additive manufacturing process, the second clamping element can also be manufactured by the additive manufacturing process.

In some embodiments, the first clamping element is first formed and the part is formed on the top of the first clamping element along the build-on direction. By using the parallel vice jaw clamping system, the first clamping element can be designed to have a simple shape, such as cuboid or cubic. When the first clamping element is directly built on the build plate, the requirement for separation can be low, because the cutting surface does not provide any function after the separation. It can neither has any negative influences on the final quality of the part and nor reduces the clamping stability. The part can be simply build on the top of the first clamping element and has a large freedom in view Various powder Bed Fusion process can be applied. For example, DMLS, SLS, DMP and LPBF. SLM.

The method is suitable but not limited for producing the part having a substantial squared or solid shape, which can be stably formed on the top of the first clamping element.

Such part is in particular a medical-technical implants and instruments, stamps and inserts for tool and mold making, such as a spinal cage. Additionally, the part can be small to medium-sized structural parts for the automotive or aircraft industry. The size of the part can also vary. For example, the cross-section of the part can be in the range of 10 mm² to 500 mm².

Exemplary Embodiments

Figures 11, 12:
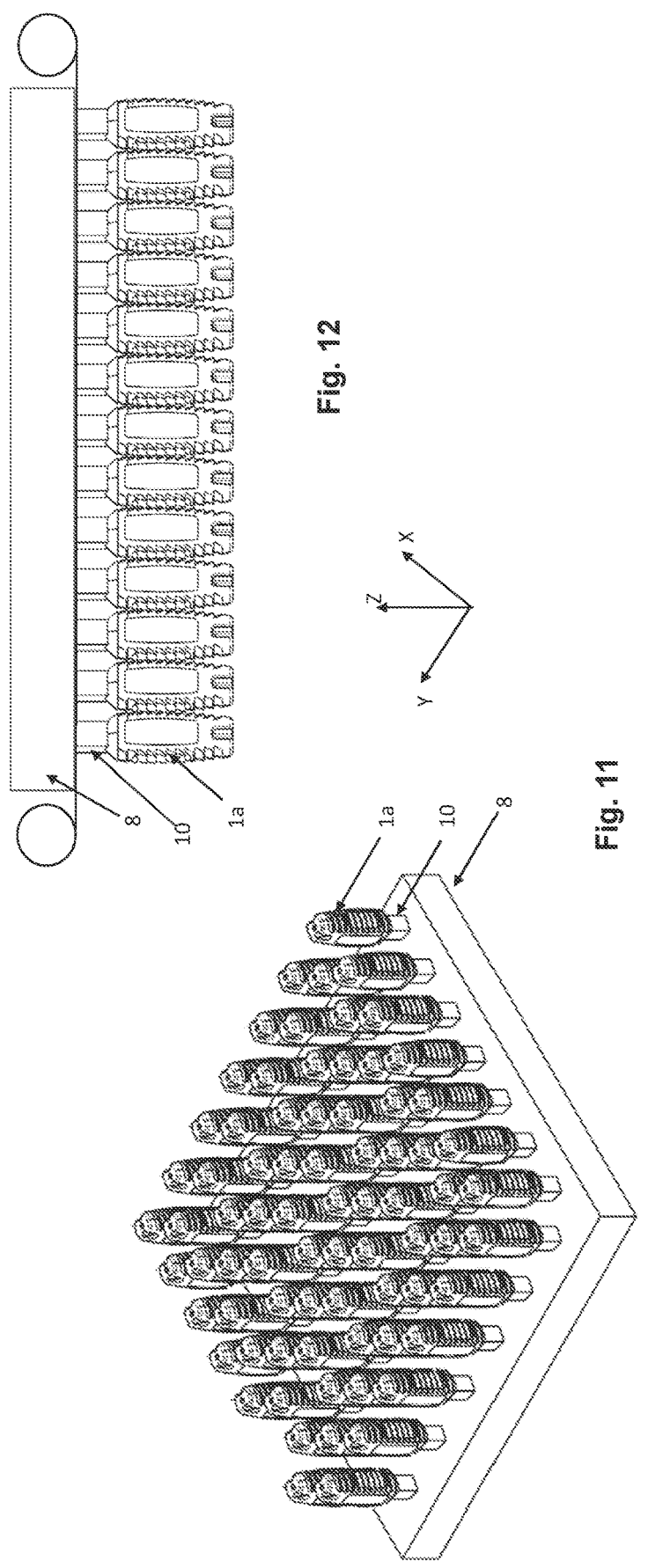
FIG. 11 illustrates a plurality of parts with first clamping elements formed on a build plate.
FIG. 12 illustrates the separation of the parts from a build plate.

FIGS. 1, 2 and 3 illustrate three different parts, each of which is manufactured together with a first clamping element by the method according to an embodiment of the present invention. As shown in FIG. 11, the part and the first clamping element are an integrated device and manufactured by additive manufacturing process in one run. Normally, a large number of parts are formed on one build plate 8 in parallel. The method of an embodiment of the present invention includes forming the first clamping element directly on the build plate first and forming the part on the top of the first clamping element in the build-on direction, namely in the Z-direction. After the additive manufacturing process, each part together with the first clamping element is separated from the build plate as illustrated in FIG. 12 such that the individual part can be further processed to achieve the final shape and to optimize the surface quality. In most of applications, the post-processing is conducted at outside of the machine for additive manufacturing process and in a machine tool, thus, the individual part must be stably held in the machine tool for post-processing in a desired position. Direct integration of the clamping element on the part ease the clamping of the part in the machine tool and provides the advantage of a precise positioning and automatic referencing.

FIGS. 1, 2 and 3 show the examples of the parts having different shapes and the first clamping elements with different designs. The first clamping element 10, 10a, 10b is a solid element and has a substantially cuboid shape with four side surfaces. A plurality of female clamping contours 20, 20a, 20b are embedded on at least one side surface of the first clamping element. The FIG. 1 shows one example of the first clamping element 10, which features on all side surfaces female clamping contours. In this example, the first clamping element 10 has a cubic shape. On the first side surface 11 of the first clamping element, the female clamping contours 20 are arranged in parallel to each other and apart from the bottom surface of the first clamping element with a defined distance. This has the advantage that during separation, the female clamping contours cannot be touched by the cutting means. In this example, the configuration of the female clamping contour on the second side surface 12 is the same as on the first side surface 11. However, it is not limited to such design. The shape, the positon, the dimension, and the number of the female clamping contours on different side surfaces can differ, but preferably be identical on the two parallel side surfaces, which come into contact with the second clamping element.

FIG. 2 shows another example of the first clamping element 10a that features the female clamping contours 20a on two parallel side surfaces. On the first side surface 11a, the female clamping contours are also arranged apart from the bottom of the first clamping element. The side surface in parallel to the first side surface 11a is on the backside of the first clamping element. On the second side surface 12a, which is orthogonal to the first side surface 11a, no female clamping contour is provided. In order to allow an ease separation, a separation region 15 is formed on the top of the female clamping contour and below the part 1a.

FIG. 3 shows an additional example of the first clamping element 10b having female clamping contours 20b on one side surface 11b. It can be taken from the FIGS. 1, 2 and 3 that the shape of the first clamping element can vary in the length, width and the height.

Figures 4, 4A, 4B:
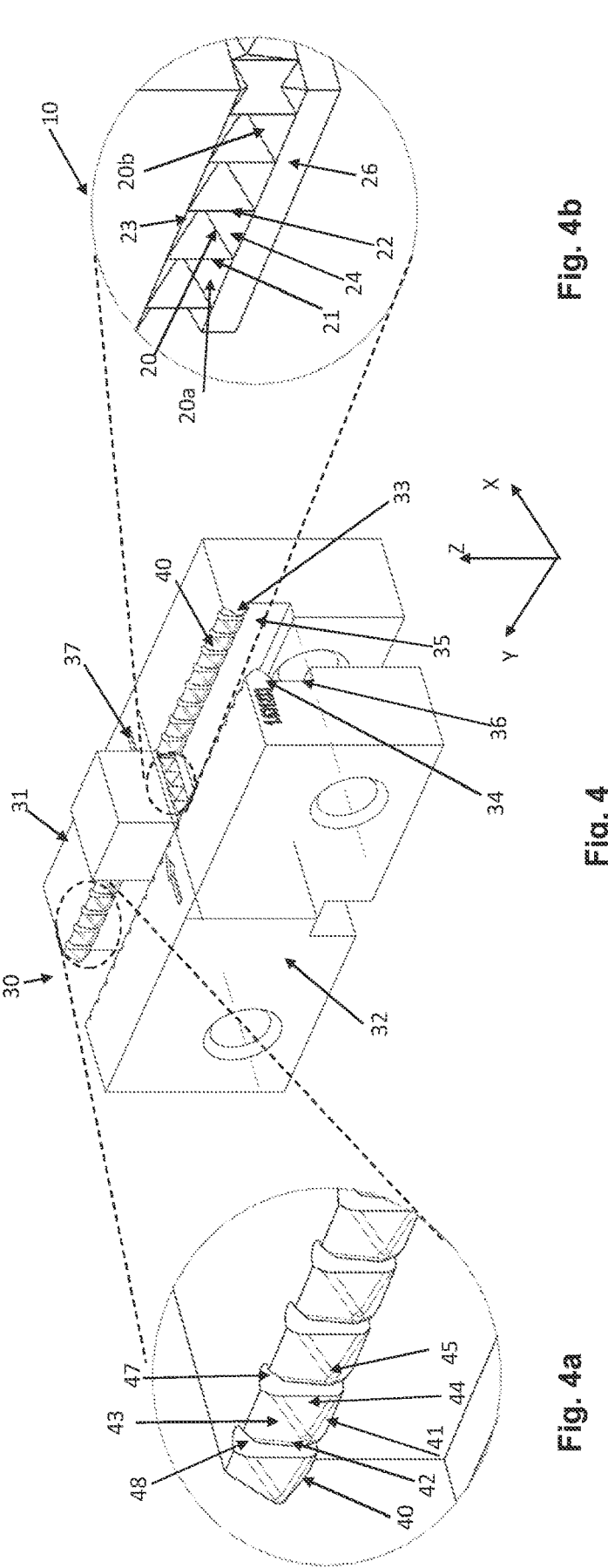
FIG. 4 illustrates a clamped state of a first clamping element and a second clamping element.
FIGS. 4*a* and 4*b* illustrate enlarged views of female clamping contours and male clamping contours.

FIG. 4 shows the first clamping element and a second clamping element in a clamped state, in which the first clamping element is clamped between two vise jaws 31, 32 of the second clamping element 30. Each vise jaw is interacted with one side surface of the first clamping element. On the top portion of the vise jaw, a plurality of male clamping contours 40 are provided on the first contacting surface 33 of the vise jaw and on the second contacting surface 34 of the vise jaw. The shape of the male clamping contour is complementary to the shape of the female clamping contour of the first clamping element such that each male clamping contour can be precisely and stably received in one female clamping contour to obtain a stable clamping and obtain a self-referencing in the X and Z direction.

FIGS. 4a and 4b depict the enlarged views of the male clamping contours 40 and the female clamping contours 20. The female clamping contour 20 is formed as a pyramid-shaped recess by four sidewalls. The apex of the pyramid defined by the common point of the four sidewalls projects inwardly. Two sidewalls 21 22 are configured in a way that they are shared by two neighboring female clamping contours. These sidewalls are defined as neighboring side walls. For example, the neighboring sidewall with the reference numeral 21 is shared between the female clamping contours with the reference numerals 20 and 20a. The neighboring side wall with the reference numeral 22 is shared between the female clamping contours with the reference numerals 20 and 20b. The male clamping contour 40 features a complementary shape of the female clamping contour having the same pyramid shape. The male clamping contour has a base arranged on the side surface of the vise jaw and four lateral surfaces 41 42 43 44 and the apex 45 protruding outwardly. Between two male clamping contours a channel 47, 48 is formed on the contacting surface of the vise jaw. Each channel is shared by two male clamping contours such that the neighboring walls of the female clamping contour can be received in the channel to achieve a stable clamping. In the clamping state, the four lateral surfaces of the male clamping contour abut on the inner surface of the four sidewalls of the female clamping contours. The channels are provided to ensure the contact of the two element despite the production tolerance. In further, the sidewalls 21, 22 of the female clamping contours are received in the channels 48 of the male clamping contours. The channels serve as an exemption such that the lateral surfaces of the male clamping contours can be pressed on the inner surface of the sidewalls of the female clamping contour to achieve the stable clamping. It is advantageous to design the male clamping contours having rounded edge to avoid the edge contact, because surface clamping can provide higher clamping forces than the edge contact.

In further, the second clamping element is provided with a first slot 35 and a second slot 36. They are located on the first contacting surface 33 and the second contact surface 34 of the vise jaws below the male clamping contours, respectively. The both slots sever also as an exemption such that the lateral surfaces of the male clamping element can direct interact with the female clamping contour to guarantee a surface clamping. In this manner, the part can be optimally clamped in the machine tool.

In order to determine the position of the part in the Y-direction, a marking 37 is provided on the top surface of the vise jaw to indicate the zero-point.

The first clamping element is not limited to be one single element but can comprises several clamping sections 16 as shown in FIGS. 5 and 6. At least one clamping section of the first clamping element comprises a plurality of female clamping contours 20b. The clamping sections are arranged in parallel to each other along the longitudinal directions, such as in Y-direction. All clamping sections are formed first and the part 1d is formed on the top of all clamping sections by the additive manufacturing process, thus, the clamping sections are connected indirectly through the part formed thereon.

FIGS. 7a and 7b present another example of the male clamping contour, which has a con-shaped protrusion 20b. Accordingly, the female clamping contour has a con-shaped recess to be engaged with the male clamping contour.

Figure 10:
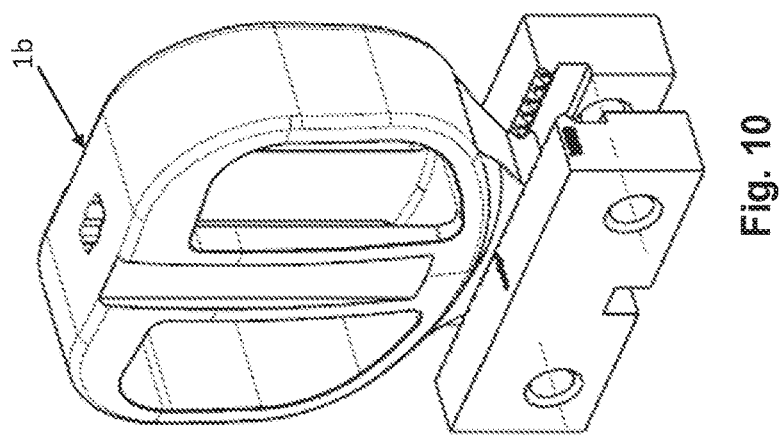
FIGS. 8-10 illustrate examples of a part.
Figure 9:
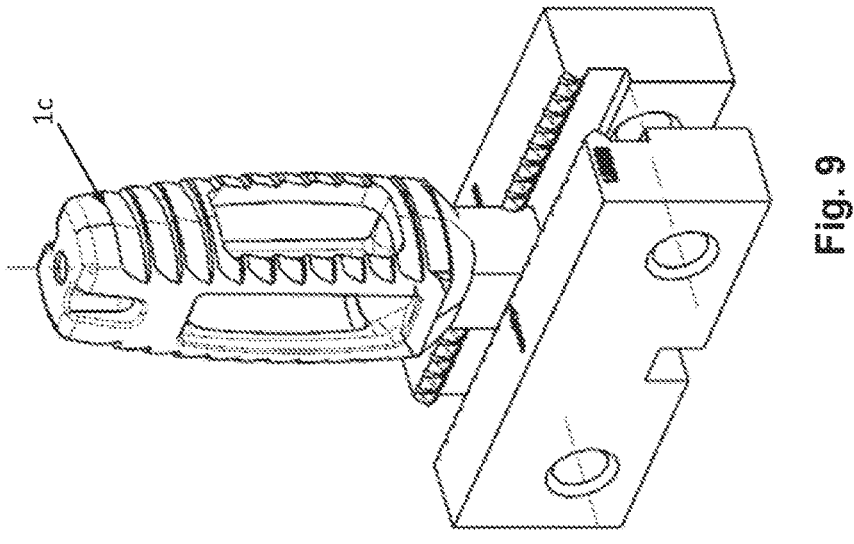
Figure 8:
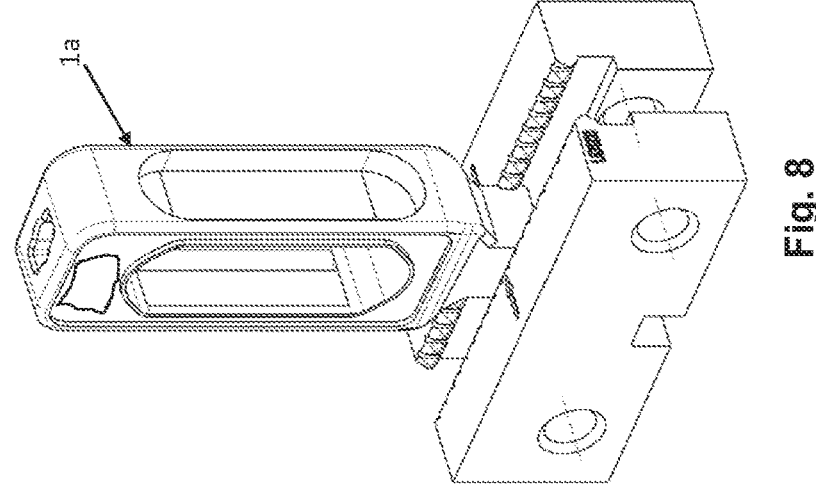

FIGS. 8, 9 and 10 illustrate three examples of the part 1a, 1b and 1c manufactured by methods of embodiments of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

1, 1a, 1b, 1c part
8 build plate
10, 10a, 10b first clamping element
11, 11a, 11b first side surface of clamping element
12, 12a, 12b second side surface of clamping element
15 separation region
16 clamping section
20, 20a 20b, female clamping contour
21, 22 sidewall of the female clamping contour
30 second clamping element
31 first vise jaw
32 second vise jaw
33 first contacting surface

34 second contacting surface
35 first slot
36 second slot
37 second marking
38 con-shaped male clamping contour
40 male clamping contour
41, 42, 43, 44 lateral surfaces of the male clamping contour
45 apex of the pyramid-shaped male clamping contour
47 first channel
48 second channel

The invention claimed is:

1. A method for manufacturing a part by additive manufacturing process comprising:
   a. providing CAD data defining a geometry of the part;
   b. providing CAD data defining a geometry of a first clamping element, wherein the geometry of the first clamping element is determined in consideration of a geometry of a second clamping element such that after the additive manufacturing process the first clamping element is clamped into the second clamping element for holding the part in a desired position for post-processing;
   c. generating machining data based on the CAD data defining the geometry of the part and the CAD data defining the geometry of the first clamping element; and
   d. forming the part and the first clamping element by additive manufacturing process based on the machining data;
   wherein: the first clamping element has at least two parallel side surfaces and the second clamping element has two vice jaws positioned in parallel to each other along a longitudinal direction of the second clamping element,
   in a clamped state, the two parallel side surfaces of the first clamping element interact with the vice jaws of the second clamping element, and
   on at least one of the parallel side surfaces of the first clamping element, a plurality of female clamping contours are provided for engaging with a plurality of male clamping contours provided on the vise jaw in the clamped state.

2. The method according to claim 1, wherein the female clamping contour and the male clamping contour have a complementary shape to obtain a form-fit in the clamped state.

3. The method according to claim 1, wherein the female clamping contour is a recess that tapers from a base to an apex or an edge.

4. The method according to claim 3, wherein the female clamping contour has a pyramid-shaped recess, a cone-shaped recess, a hemispherical recess, or a wedge-shaped recess, in particular the female clamping contour defines references of a first direction and a second direction.

5. The method according to claim 4, wherein a first marking is provided on the first clamping element and a second marking is provided on the second clamping element for referencing in a third direction.

6. The method according to claim 1, wherein the part is a medical-technical implant, a medical-technical instrument, or a stamp and an insert for tool and mold making.

7. The method according to claim 4, wherein the first direction and the second direction are an X direction and Z direction of a three-dimensional coordinate system.

8. The method according to claim 3, wherein the female clamping contour is a cubic recess, a cylindrical recess, or a spherical recess.

9. The method according to claim 1, wherein the first clamping element is a cuboid or is cubic.

10. The method according to claim 1, wherein a separating portion is formed between the first clamping element and the part.

11. The method according to claim 1, wherein the first clamping element is first formed and the part is formed on a top of the first clamping element by a Powder Bed Fusion process.

12. The method according to claim 11, wherein the Power Bed Fusion process includes one of Direct Metal Laser Sintering, Selective Laser Sintering, Direct Metal Printing, and Laser Powder Bed Fusion.

13. The method according to claim 1, wherein the male clamping contour is a protruding element that tapers from a base to an apex or an edge.

14. The method according to claim 13, wherein the male clamping contour has a shape of pyramid, cone, hemisphere, or wedge in particular, the apex of the pyramid-shaped male clamping contours is oriented outwardly to provide an abutment against the female clamping contour in the clamped state.

15. The method according to claim 1, wherein the male clamping contour has a shape of cubic, a cylinder or sphere.

16. The method according to claim 1, wherein the second clamping element is manufactured by Powder Bed Fusion.

17. The method according to claim 16, wherein the Power Bed Fusion process includes one of Direct Metal Laser Sintering, Selective Laser Sintering, Direct Metal Printing, and Laser Powder Bed Fusion.

18. The method according to claim 5, wherein the third direction is a Y direction in the three-dimensional coordinate system.

19. A clamping system for holding a part produced by an additive manufacturing process comprising:

a first clamping element having at least two parallel side surfaces; and a second clamping element having two vice jaws positioned in parallel to each other along a longitudinal direction of the second clamping element, wherein in a clamped state, the two parallel side surfaces of the first clamping element interact with the vice jaws of the second clamping element, wherein on at least one of the parallel side surfaces of the first clamping element a plurality of female clamping contours are arranged for engaging with a plurality of male clamping contours arranged on the vise jaw in the clamped state, and wherein on a top of the first clamping element the part is formed in one piece by additive manufacturing.

* * * * *